Patented Mar. 8, 1938

2,110,694

UNITED STATES PATENT OFFICE 2,110,694

WATER-INSOLUBLE AZO DYESTUFFS

Fritz Ballauf, Cologne-Holweide, and Otto Bayer, Leverkusen I. G.-Werk, Germany, assignors to General Aniline Works, Inc., New York, N. Y., a corporation of Delaware No Drawing. Application August 31, 1936, Serial No. 98,736. In Germany September 7, 1935

10 Claims. (Cl. 260—89)

The present invention relates to water-insoluble azodyestuffs and to fibers dyed therewith, more particularly it relates to water-insoluble azo-dyestuffs which may be represented by the following general formula:

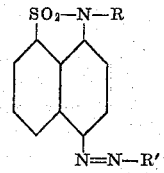

In the said formula R stands for the radical of a hydrocarbon which may bear substituents, such as alkyl, hydroxy-alkyl, phenyl, chlorophenyl, methyl-phenyl, methoxy-phenyl and the like, and R' stands for the radical of an aryl amide of an aromatic ortho-hydroxycarboxylic acid.

Our new dyestuffs are obtainable by diazotizing an amine of the general formula:

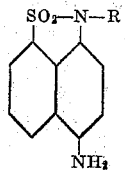

in which R means the same as stated above and coupling in substance or on substratum, especially on vegetable fibers, with an aryl amide of an aromatic ortho-hydroxycarboxylic acid, thereby the components being selected in such a manner that no watersolubilizing group, as, for example, the sulfonic acid- or the carboxylic acid group, is present.

The dyestuffs prepared on the fiber in general yield deep shades of fairly good fastness to light.

The amines of the above constitution are obtained, for example, by converting by the action of agents splitting off water 1-naphthylamine-8-sulfonic acid substituted in the amino group into the corresponding substituted naphthosultams and by nitrating and reducing the same.

The invention is illustrated by the following examples:

Example 1

50 grams of cotton yarn are grounded for half an hour in 1000 ccs. of an aqueous solution alkaline with soda prepared in the usual manner from 5 grams of 2′.3′-hydroxynaphthoylamino-2-methyl-4-methoxybenzene. The yarn is then centrifuged, and the dyeing is developed in 1000 ccs. of a diazo bath at 40° C. prepared in the usual manner by diazotizing 2.4 grams of the amine of the formula:—

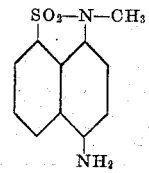

and neutralizing with sodium acetate; thereupon the yarn is rinsed, soaped and dried. A deep blue of good fastness to light, to boiling and to chlorine is thus obtained.

The dyestuff corresponds to the following formula:

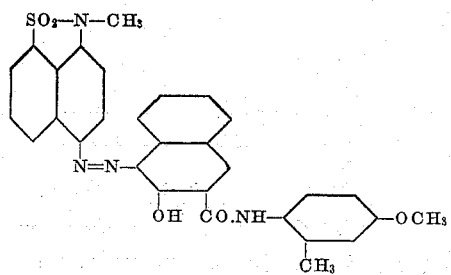

Example 2

24 grams of 4-amino-N-methylnaphthosultam are diazotized in the known manner. The diazo solution is then introduced into an alkaline solution prepared from 31 grams of 2′.3′-hydroxy-naphthoylamino-2-methyl-4-methoxybenzene. The reaction mixture is then rendered acid with acetic acid, and the dyestuff separated is filtered off. A reddish blue powder is thus obtained.

The dyestuff corresponds to the following formula:

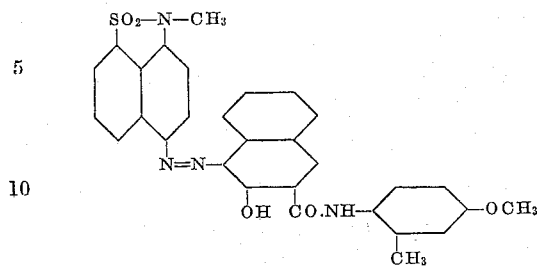

Example 3

24 grams of 4-amino-N-methylnaphthosultam are converted in the known manner, e. g. with sarcosine, into a watersoluble diazoamino compound and mixed with 31 grams of 2'.3'-hydroxynaphthoylamino-2-methyl-4-methoxybenzene. By adding 380 ccs. of water, 20 grams of Turkey red oil and 30 grams of caustic soda lye 32% both products are dissolved. Thereupon 500 grams of a starch tragacanth thickener are stirred in. The cotton printed with this solution is dried and then treated with an acid in the form of a vapour or liquid, developed and soaped. A reddish blue is thus obtained.

The dyestuff corresponds to the following formula:

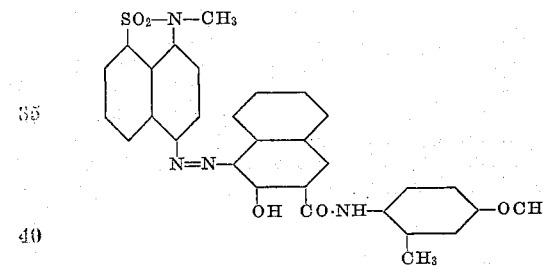

In an analogous manner there is obtained by using the method above described:

| By combination of— | With— | |
|---|---|---|
| 2'.3'-hydroxynaphthoylamino-2-methylbenzene. | 4 - amino - N - methyl - naphthosultam. | A blue |
| 2'.3'-hydroxynaphthoylamino-2-methyl-4-methoxybenzene. | ------do------ | A reddish blue |
| 2'.3'-hydroxynaphthoylamino-2-methyl-5-chlorobenzene. | ------do------ | A blue |
| 2'.3'-hydroxynaphthoylamino-2.4-dimethoxy-5-chlorobenzene | ------do------ | A bluish violet. |
| 2'.3' - hydroxynaphthoylamino-2-chlorobenzene | ------do------ | A blue |
| 2'.3'-hydroxynaphthoylamino-4-methoxybenzene | ------do------ | A blue |
| 2'.3'-hydroxynaphthoylamino-2-methoxybenzene | ------do------ | A reddish blue |
| 2'.3'-hydroxynaphthoylamino-1-naphthalene | ------do------ | A blue |
| 7'.8' - benzo - 2'.3' - hydroxy - carbazoylamino-4-methoxybenzene | ------do------ | A dark blue |
| 2'.3'-hydroxynaphthoylamino-4-methoxybenzene | 4 - amino-N-hydroxyethyl-naphthosultam | A blue |
| 2'.3'-hydroxynaphthoylamino-1-naphthalene | ------do------ | A navy blue |
| 7'.8' - benzo - 2'.3' - hydroxy - carbazoylamino-4-methoxybenzene | ------do------ | A navy blue |
| 2'.3'-hydroxynaphthoylamino-2.4-dimethoxy - 5 - chloro - benzene. | 4-amino-N-n-propyl-naphthosultam | A bluish corinth |
| 2'.3'-hydroxynaphtholyamino-4-ethoxybenzene | ------do------ | A bluish corinth |
| 2'.3'-hydroxynaphthoylamino-2-methyl-4-methoxybenzene. | ------do------ | A bluish corinth |
| 2'.3'-hydroxynaphthoylamino-α-naphthalene. | ------do------ | A navy blue |
| 2'.3'-hydroxynaphthoylamino-β-naphthalene. | ------do------ | A dark blue. |
| 7'.8' - benzo - 2'.3' - hydroxy - carbazoylamino-4-methoxy-benzene | ------do------ | A blackish blue |
| 2'.3'-hydroxynaphthoylamino-α-naphthalene. | 4 - amino - N - ethyl-naphthosultam. | A dark blue |
| 2'.3'-hydroxynaphthoylamino-benzene. | 4 - amino - N - n - butyl-naphthosultam. | A corinth |
| 2'.3'-hydroxynaphthoylamino-2.4 - dimethoxy - 5 - chlorobenzene. | ------do------ | A bluish corinth |
| 2'.3'-hydroxynaphthoylamino-2-methyl-4-chlorobenzene. | ------do------ | A navy blue |
| 2'.3'-hydroxynaphthoylamino-2-methoxy-4-chlorobenzene. | ------do------ | A bluish corinth |
| 2'.3'-hydroxynaphthoylamino-2-methylbenzene. | ------do------ | A reddish corinth |
| 2'.3'-hydroxynaphthoylamino-2-naphthalene. | ------do------ | A dark brown |
| 2'.3'-hydroxynaphthoylamino-3-nitrobenzene. | ------do------ | A navy blue |
| 7'.8' - benzo - 2'.3' - hydroxycarbazoylamino-4-methoxybenzene. | ------do------ | A navy blue |
| 2'.3'-hydroxynaphthoylamino-2-methyl-4-methoxybenzene. | 4 - amino - N - phenyl-naphthosultam. | A bluish violet |
| 2'.3'-hydroxynaphthoylamino-2-methoxy-5-chlorobenzene. | ------do------ | A corinth |
| 2 - hydroxycarbazole - 3 - carboxylic acid-4-chloro-anilide. | ------do------ | A reddish brown |
| 2'.3'-hydroxynaphthoyl-amino-2-naphthalene. | ------do------ | A bluish violet |
| 2'.3'-hydroxynaphthoyl-amino-4-chloro-2-methyl-benzene. | ------do------ | A bluish violet |
| 7'.8' - benzo - 2'.3' - hydroxycarbazoylamino-4-methoxy benzene. | ------do------ | A bluish black |
| 7'.8' - benzo - 2'.3' - hydroxycarbazoylamino - 2 - methyl-4-methoxybenzene. | ------do------ | A bluish black |
| 2'.3'-hydroxynaphthoylamino-2.5 - dimethoxy - 4 - chlorobenzene. | 4-amino-N-(p-anisyl)-naphthosultam. | A reddish corinth |
| 2'.3'-hydroxynaphthoylamino-2 - methyl - 4 - methoxy - benzene. | ------do------ | A bluish corinth |
| 2'.3'-hydroxynaphthoylamino-1-naphthalene. | ------do------ | A reddish corinth |
| 7'.8' - benzo - 2'.3' - hydroxycarbazoylamino-4-methoxybenzene. | ------do------ | A black |
| 7'.8' - benzo - 2'.3' - hydroxycarbazoylamino - 2 - methyl-4-methoxybenzene. | ------do------ | A bluish black |

We claim:
1. Water-insoluble azodyestuffs of the general formula:

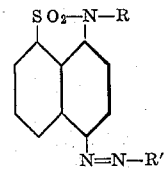

wherein R stands for the radical of a hydrocarbon, and R' stands for a radical selected from the group consisting of aryl amides of 2.3-hydroxynaphthoic acid and benzocarbazole-ortho-hydroxycarboxylic acid, yielding when produced on the fiber in general deep shades of good fastness properties.

2. Water-insoluble azodyestuffs of the general formula:

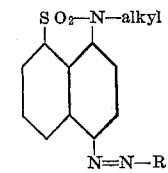

wherein R' stands for the radical of a 2.3-hydroxynaphthoic acid aryl amide, yielding when produced on the fiber in general deep shades of good fastness properties.

3. Water-insoluble azodyestuffs of the general formula:

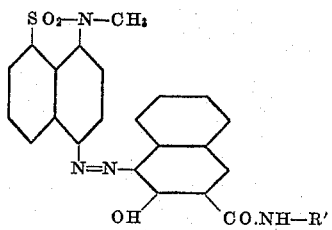

wherein R' stands for a radical of the benzene series, yielding when produced on the fiber in general deep shades of good fastness properties.

4. The water-insoluble azodyestuffs of the formula:

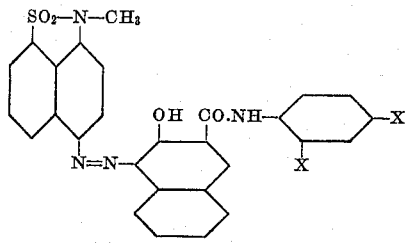

wherein one X stands for a methoxy group and the other X stands for hydrogen, yielding when produced on the fiber, blue shades of good fastness properties.

5. The water-insoluble azodyestuff of the formula:

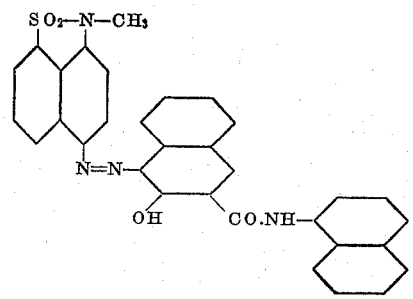

yielding when produced on the fiber blue shades of good fastness properties.

6. Fibers dyed with a dyestuff as claimed in claim 1.
7. Fibers dyed with a dyestuff as claimed in claim 2.
8. Fibers dyed with a dyestuff as claimed in claim 3.
9. Fibers dyed with a dyestuff as claimed in claim 4.
10. Fibers dyed with a dyestuff as claimed in claim 5.

FRITZ BALLAUF.
OTTO BAYER.